United States Patent
Thapa

(10) Patent No.: US 8,700,195 B2
(45) Date of Patent: Apr. 15, 2014

(54) SYNCHRONIZATION AND MIXING OF AUDIO AND VIDEO STREAMS IN NETWORK BASED VIDEO CONFERENCING CALL SYSTEMS

(71) Applicant: Mukund N. Thapa, Palo Alto, CA (US)

(72) Inventor: Mukund N. Thapa, Palo Alto, CA (US)

(73) Assignee: Optical Fusion Inc., Palo Alto, CA (US)

( * ) Notice: Subject to any disclaimer, the term of this patent is extended or adjusted under 35 U.S.C. 154(b) by 0 days.

(21) Appl. No.: 13/646,395

(22) Filed: Oct. 5, 2012

(65) Prior Publication Data

US 2013/0027507 A1 Jan. 31, 2013

Related U.S. Application Data

(62) Division of application No. 12/242,358, filed on Sep. 30, 2008, now Pat. No. 8,583,268.

(60) Provisional application No. 60/976,464, filed on Sep. 30, 2007.

(51) Int. Cl.
*G06F 17/00* (2006.01)

(52) U.S. Cl.
USPC .......................................................... 700/94

(58) Field of Classification Search
USPC .......................................................... 700/94
See application file for complete search history.

(56) References Cited

U.S. PATENT DOCUMENTS

| | | | |
|---|---|---|---|
| 4,720,850 A | 1/1988 | Oberlander et al. | |
| 5,689,641 A | 11/1997 | Ludwig et al. | |
| 5,729,532 A | 3/1998 | Bales et al. | |
| 5,973,724 A | 10/1999 | Riddle | |
| 6,603,450 B1 | 8/2003 | Yamazaki et al. | |
| 6,898,620 B1 | 5/2005 | Ludwig et al. | |
| 6,906,741 B2 | 6/2005 | Canova et al. | |
| 6,940,855 B2 | 9/2005 | Okamura | |
| 6,959,322 B2 | 10/2005 | Ludwig et al. | |
| 6,972,786 B1 | 12/2005 | Ludwig | |
| 7,084,898 B1 | 8/2006 | Firestone et al. | |
| 7,185,054 B1 | 2/2007 | Ludwig et al. | |
| 7,369,699 B1 | 5/2008 | Christie | |
| 7,617,280 B1 | 11/2009 | Webster et al. | |
| 7,620,410 B2 | 11/2009 | Takizawa et al. | |
| 7,672,742 B2 * | 3/2010 | Ng et al. | 700/94 |
| 8,060,366 B1 | 11/2011 | Maganti et al. | |
| 8,081,205 B2 * | 12/2011 | Baird et al. | 348/14.08 |
| 8,213,503 B2 * | 7/2012 | Tu et al. | 375/240.03 |

(Continued)

FOREIGN PATENT DOCUMENTS

EP   1465193 A1 * 10/2004

OTHER PUBLICATIONS

Design and Perfromance of Multi_Stream MPEG; Boucher: copyright 1995.*
H.323 specification; copyright 2001.*

(Continued)

*Primary Examiner* — Paul McCord
(74) *Attorney, Agent, or Firm* — Fenwick & West LLP

(57) ABSTRACT

In one aspect, audio streams are added to a mix until the mix is either complete (i.e., all audio streams have been added) or the mix is closed early (i.e., before the mix is complete). In another aspect, audio and video streams are synchronized by playing back the audio stream and then synchronizing display of the video frames to the playback of the audio stream.

8 Claims, 8 Drawing Sheets

(56) References Cited

U.S. PATENT DOCUMENTS

| | | | |
|---|---|---|---|
| 8,214,516 B2* | 7/2012 | Gupta et al. | 709/231 |
| 8,335,576 B1 | 12/2012 | Bradshaw et al. | |
| 2002/0145610 A1 | 10/2002 | Barilovits et al. | |
| 2003/0035371 A1 | 2/2003 | Reed et al. | |
| 2003/0043260 A1 | 3/2003 | Yap et al. | |
| 2003/0174826 A1 | 9/2003 | Hesse | |
| 2004/0008635 A1* | 1/2004 | Nelson et al. | 370/260 |
| 2004/0119814 A1* | 6/2004 | Clisham et al. | 348/14.08 |
| 2004/0258047 A1* | 12/2004 | Miao | 370/352 |
| 2005/0073575 A1 | 4/2005 | Thacher et al. | |
| 2005/0099492 A1 | 5/2005 | Orr | |
| 2005/0213739 A1 | 9/2005 | Rodman et al. | |
| 2005/0237377 A1 | 10/2005 | Chapweske et al. | |
| 2005/0248652 A1* | 11/2005 | Firestone et al. | 348/14.09 |
| 2005/0256925 A1 | 11/2005 | Luo et al. | |
| 2005/0259754 A1* | 11/2005 | Ho et al. | 375/240.28 |
| 2005/0276282 A1* | 12/2005 | Wells et al. | 370/503 |
| 2006/0002681 A1* | 1/2006 | Spilo et al. | 386/46 |
| 2006/0031290 A1 | 2/2006 | Mannaru et al. | |
| 2006/0038877 A1 | 2/2006 | Richardson et al. | |
| 2006/0050155 A1 | 3/2006 | Ing et al. | |
| 2006/0062368 A1 | 3/2006 | Saha et al. | |
| 2006/0104347 A1* | 5/2006 | Callan et al. | 375/240.01 |
| 2006/0129909 A1 | 6/2006 | Butt et al. | |
| 2007/0064901 A1 | 3/2007 | Baird et al. | |
| 2007/0093238 A1 | 4/2007 | Lin | |
| 2007/0188597 A1 | 8/2007 | Kenoyer | |
| 2007/0200925 A1 | 8/2007 | Kim | |
| 2007/0206089 A1 | 9/2007 | Eshkoli et al. | |
| 2008/0037580 A1 | 2/2008 | Shaffer et al. | |
| 2008/0037749 A1 | 2/2008 | Metzger et al. | |
| 2008/0088698 A1 | 4/2008 | Patel et al. | |
| 2008/0100694 A1 | 5/2008 | Barkley et al. | |
| 2008/0117838 A1 | 5/2008 | Yee et al. | |
| 2008/0284841 A1 | 11/2008 | Modai et al. | |
| 2008/0291891 A1* | 11/2008 | Jerlhagen et al. | 370/350 |

OTHER PUBLICATIONS

H.225 specification; copyright 2000.*
United States Office Action, U.S. Appl. No. 13/605,741, Mar. 15, 2013, thirteen pages.
Intel Corporation, "High Definition Audio Specification, Revision 1.0a," Jun. 17, 2010, two hundred twenty-five pages.
PCT International Search Report and Written Opinion, PCT Application No. PCT/US2008/078326, Dec. 12, 2008, seven pages.
PCT International Search Report and Written Opinion, PCT Application No. PCT/US2008/078203, Dec. 2, 2008, seven pages.
PCT International Search Report and Written Opinion, PCT Application No. PCT/US2008/078196, Dec. 2, 2008, nine pages.
PCT International Search Report and Written Opinion, PCT Application No. PCT/US2008/078206, Dec. 2, 2008, six pages.
Singh, K.N., "Reliable, Scalable and Interoperable Internet Telephony," Columbia University Thesis, 2006, copyright 2006, [Online] [Retrieved on Nov. 23, 2008] Retrieved from the Internet<URL:http://www1.cs.columbia.edu/-kns10/publication/thesis.pdf>.

* cited by examiner

SYNCHRONIZATION AND MIXING OF AUDIO AND VIDEO STREAMS IN NETWORK BASED VIDEO CONFERENCING CALL SYSTEMS

CROSS REFERENCE TO RELATED APPLICATIONS

This application is a divisional application of U.S. application Ser. No. 12/242,358, filed on Sep. 30, 2008 and claims priority to U.S. Provisional Application No. 60/976,464, "Video Conference User Interface and Features" by Mukund Thapa filed on Sep. 30, 2007. All of these applications are incorporated by reference herein in their entirety.

BACKGROUND OF THE INVENTION

1. Field of the Invention

The present invention relates generally to video conferencing over a network. In particular, the present invention is directed towards synchronization and/or mixing of audio and video streams during a networked video conference call.

2. Description of Background Art

Conventional networking software for video and audio conferencing permits one-way, two-way and in some cases multi-way communication between participants. Because each participant may be in a different environment and at a different location on a network, the transmission and reception of audio and video packets between various participants and/or to a central server may vary among them. For example, a participant may receive packets from a nearby participant in a more reliable fashion and with less delay than those from a participant that is more remotely located on the network. Packets may also be received out of order.

However transmitted and received over a network, audio and video data must be synchronized and mixed during display in order to produce a good video conferencing experience. For example, if the video and audio of a participant are not synchronized, then his mouth movements will not match his speech. The result can be annoying at best and can hinder communications at worst. Similarly, if the audio and/or video of different participants are not synchronized, then the unexpected pauses and timing may be interpreted as hesitations or other gestures. This can also hinder efficient communications between the participants.

Thus, there is a need for preferably simple approaches to synchronizing and mixing audio and/or video for networked participants in a video conference call.

SUMMARY OF THE INVENTION

In one aspect, the present invention overcomes limitations of the prior art by adding audio streams to a mix until the mix is either complete (i.e., all audio streams have been added) or the mix is closed early (i.e., before the mix is complete).

In one approach, audio streams from N senders are to be mixed. The N audio streams are received over a network. The audio streams are divided into portions that will be referred to as audio chunks (e.g., 40 ms audio chunks). The received audio chunks are buffered. A mix is opened and the process cycles through the N senders. If a sender's audio chunk has not yet been added to the mix and it is available from the buffer, then the sender's audio chunk is added to the mix. If the sender's audio chunk is already in the mix and the sender has at least one additional audio chunk buffered (i.e., waiting for use in a future mix), a wait counter is incremented for that sender. The mix is closed when audio chunks from all N senders have been added. It may also be closed early upon some predetermined condition based on the value of the wait counter(s) (e.g., if the wait counter reaches a maximum value).

In a different approach, the process is driven by receipt of audio chunks. A mix is opened. As each sender's audio chunk is received, it is evaluated for inclusion in the mix. If the sender is not yet in the mix and the received audio chunk is the correct audio chunk for the mix, then it is added to the mix. Otherwise, it is buffered for a future mix. Again, the mix is closed if audio chunks from all N senders are in the mix or if a predetermined early close condition is met. For example, a queue counter may be used to count the number of audio chunks in each sender's buffer. The mix may be closed early if the queue counter reaches some maximum value. In another aspect, once a mix is closed, the process attempts to use the audio chunks already stored in the buffers to create the next mix, rather than immediately creating a new mix based on a newly received audio chunk.

Another aspect concerns synchronizing audio streams and video streams. In one approach, the audio stream is played as a series of audio chunks. The video stream is considered one frame at a time. A time marker for the current video frame is compared to the expected time duration of the current audio chunk. If the current frame should occur during the current audio chunk, then it is displayed and the process moves to the next frame. If the current frame should occur after the current audio chunk, then the process checks again later. If the current frame should have occurred before the current audio chunk, then the frame is discarded and the process moves to a future frame.

These mixing and synchronization processes can be divided between clients and/or servers in different ways. For example, a client-server architecture can be used where the server performs most of the functionality described above. Alternately, a client-server architecture can be used where the server routes the various streams from client to client but the clients perform most of the functionality described above. The functionality can also be split between client and server. Peer-to-peer architectures can also be used.

In a preferred approach, a central server receives audio and video streams from each sender client. It sends the appropriate audio and video streams to each receiver client (recall that each client typically will act as both a sender client and a receiver client). Each receiver client mixes the audio streams and synchronizes the mixed audio stream with the video stream(s). In an alternate approach, the server mixes the audio streams to produce the appropriate composite audio stream for each receiver client. The server sends to each receiver client the mixed audio stream and any applicable video streams, and each receiver client synchronizes the received audio and video streams.

Other aspects of the invention include software, systems and components of systems for implementing the techniques described above. Yet additional aspects include methods and applications for all of the foregoing.

DETAILED DESCRIPTION OF THE PREFERRED EMBODIMENTS

Figure 1:
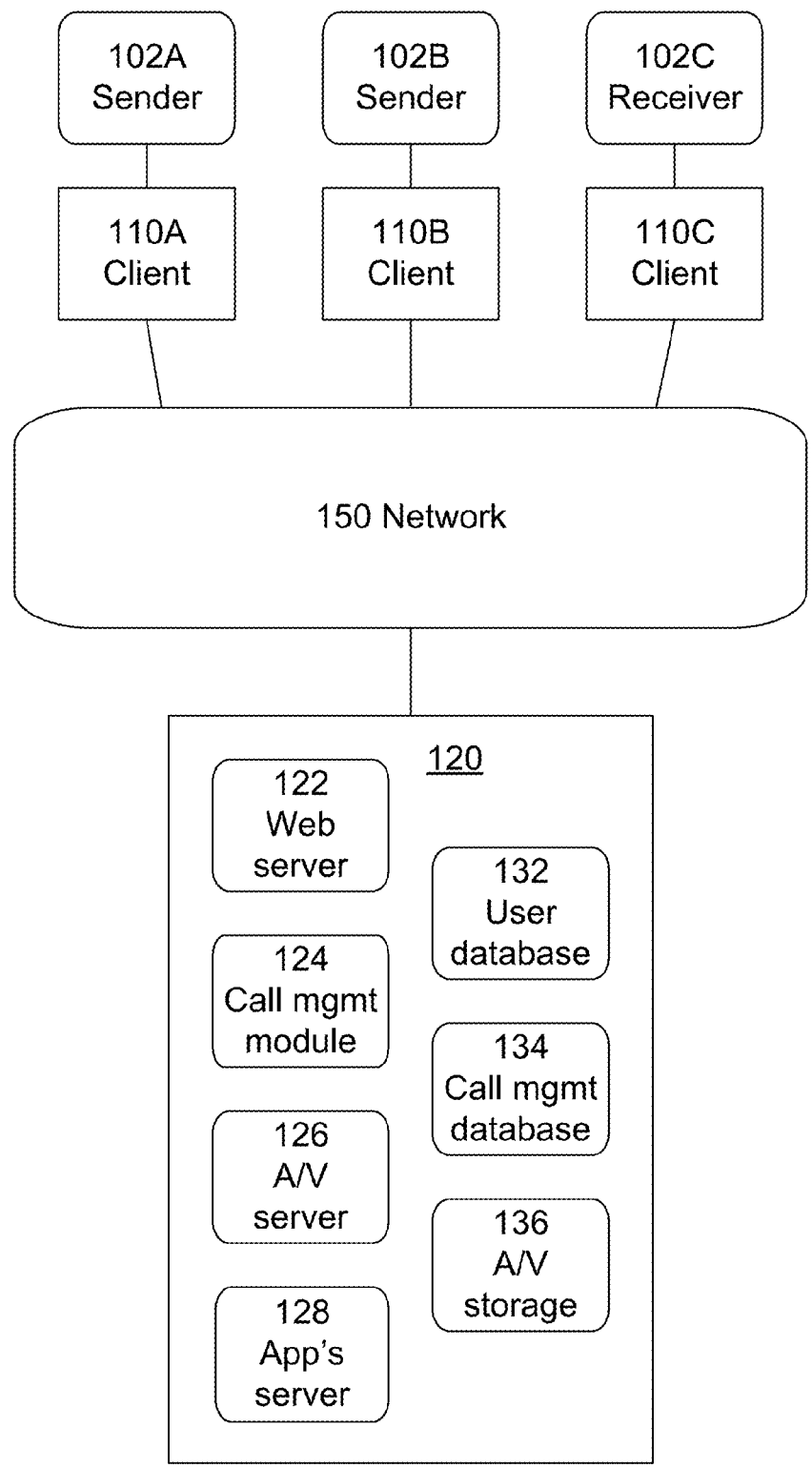
FIG. 1 is a block diagram of a server-based architecture suitable for use with the invention.

FIG. 1 is a block diagram of a server-based video conferencing architecture suitable for use with the invention. In this example, three participants 102A-C are having a video conference. Each participant 102 is operating a client device 110, which connects via a network 150 to a central server 120. In this server-based architecture, the server 120 coordinates the set up and tear down of the video conference and the collection and distribution of audio and video streams from the clients 110. In this particular example, each client 110 is a computer that runs client software with video conferencing capability. To allow full video and audio capability, each client 110 preferably includes at least one camera (for video capture), display (for video play back), microphone (for audio capture) and speaker (for audio play back).

The clients 110 are connected via the Internet to the central server 120. In this example, the central server 120 includes a web server 122, a call management module 124, an audio/video server 126 and an applications server 128. The server 120 also includes user database 132, call management database 134 and audio/video storage 136. The participants 102 have previously registered and their records are stored in user database 132. The web server 122 handles the web interface to the clients 110. The call management module 124 and call management database 134 manage the video conference calls. For example, the call management database 134 includes records of who is currently participating on which video conference calls. It may also include records of who is currently logged in and available for calls and/or their video conferencing capabilities. The audio/video server 126 manages the audio and video streams for these calls. Streaming technologies, as well as other technologies, can be used. Storage of audio and video at the server is handled by audio/video storage 136. The application server 128 invokes other applications (not shown) as required.

Figure 2:
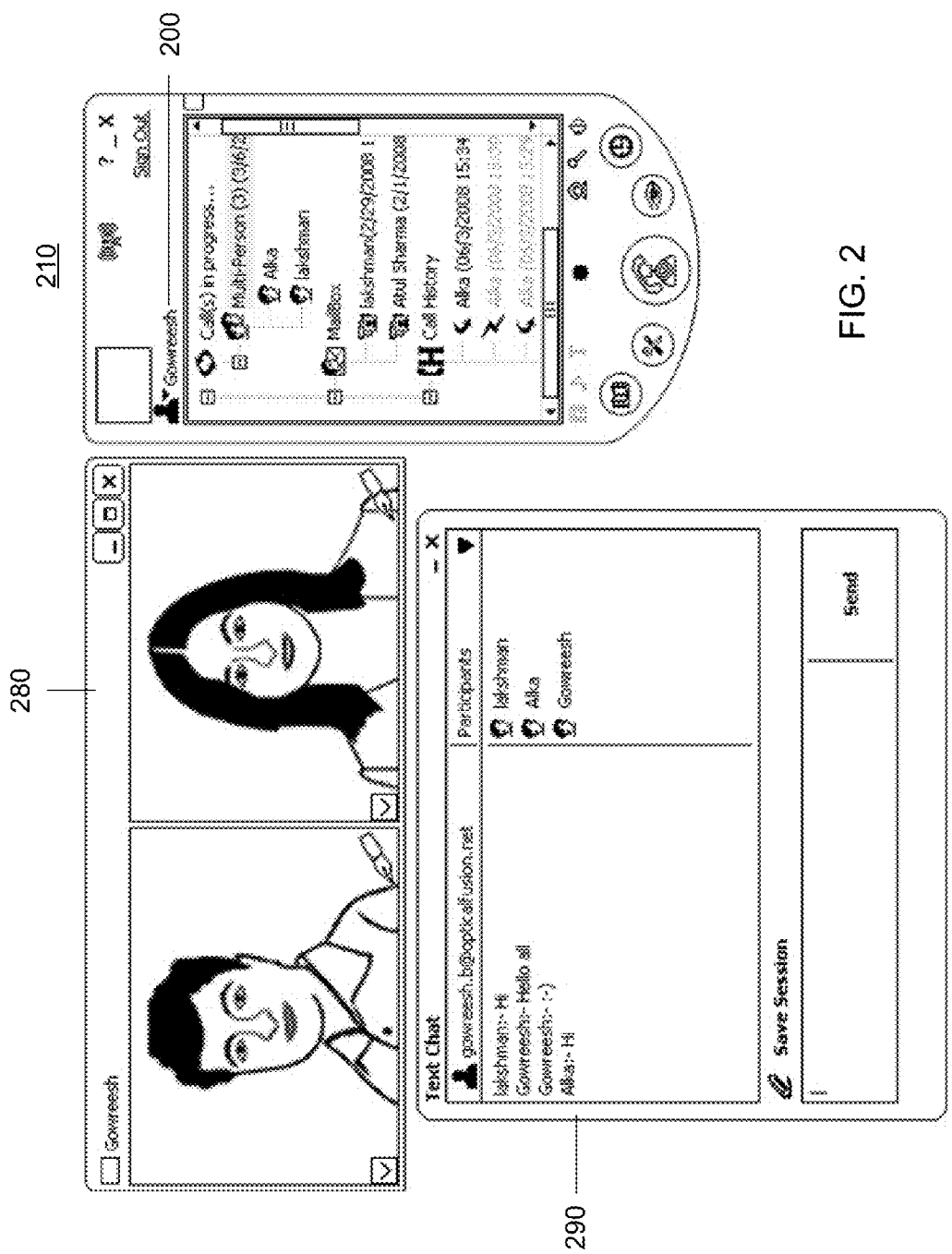
FIG. 2 is a screen shot of a participant's user interface for a video conference.

FIG. 2 is a screen shot of a participant 102's user interface for the video conference. In this example, there are three participants: Gowreesh, Alka and Lakshman. This is a multipoint example since the three participants are at different network locations. However, the invention can also be used for one-to-one situations (e.g., two-participant video call) or with more participants. FIG. 2 shows Gowreesh's screen as indicated by 200. The top-level control for the user interface will be referred to as the main communicator element 210. It includes top level controls for video conferencing. These controls typically are either displayed as graphical elements or implemented as part of pull-down menus (or other similar user interface components). Controls can be implemented as buttons, tabs, toolbars, arrows and icons, for example.

The video conference is displayed in window 280. In this example, the window 280 displays video of the other two participants: Alka and Lakshman. Gowreesh's audio system plays the corresponding audio. Ancillary window 290 lists the current participants and also provides for text chat. Files can also be shared by clicking on the attachment icon.

For purposes of explaining aspects of the invention, the participants 102A-B and their clients 110A-B will be referred to as senders, and participant 102C and its client 110C will be referred to as the receiver. In the example shown in FIG. 2, Alka and Lakshman are senders and Gowreesh is the receiver. These terms are used because Alka and Lakshman are sending audio and/or video data streams and Gowreesh is receiving these data (or derivatives of them). Of course, in most video conferences, participants will act as both senders and receivers, sending audio and video of themselves and receiving audio and video of others.

FIGS. 1-2 illustrate one example, but the invention is not limited to these specifics. For example, client devices other than a computer running client software can be used. Examples include PDAs, mobile phones, web-enabled TV, and SIP phones and terminals (i.e., phone-type devices using the SIP protocol that typically have a small video screen and audio capability). In addition, not every device need have both audio and video and both input and output. Some participants may participate with audio only or video only, or be able to receive but not send audio/video or vice versa. The underlying architecture also need not be server-based. It could be peer-to-peer, or a combination of server and peer-to-peer. For example, participants that share a local network may communicate with each other on a peer-to-peer basis, but communicate with other participants via a server. Other variations will be apparent.

As described above, one challenge of network-based video conferencing is that the various data streams from the senders 110A-B should be synchronized and mixed for display at the receiver 110C. In FIG. 2, Alka's audio and video should be synchronized to each other, and Lakshman's audio and video should be synchronized to each other. In addition, Alka's and Lakshman's audio/video streams preferably should also have some degree of synchronization. For example, if Alka asks a question, it is preferable that the video conference show Lakshman answering with his actual timing (i.e., avoiding too much relative delay or advance). This requires some synchronization of Alka's and Lakshman's audio and video streams. Alka's and Lakshman's audio streams typically would also be mixed together to form a composite audio stream for playback to Gowreesh. These tasks can be made more difficult if each of these data streams is sent as packets over network 150 since timing is not preserved in the transmission of packets. Some packets may propagate through the network 150 more quickly than others, thus arriving out of order or not arriving at all.

In the following example, it will be assumed that each sender client 110A-B creates the data streams for its respective participant 102A-B; that these data streams are sent to server 120 which retransmits them to the receiver client 110C, and that the receiver client 110C is responsible for synchronizing and mixing the data streams to produce the appropriate data streams for display to the receiver 102C. That is, in this example, all synchronization and mixing are performed locally at the client 110C.

This division of functionality is assumed primarily for purposes of explanation. In alternate embodiments, the functionality might be divided in other ways. For example, some or all of the functionality can be shifted from the receiver client 110C to the server 120. For example, the server (e.g., A/V server 126) might mix the audio streams to form a composite audio stream and then send the composite audio stream and the original video streams to the receiver client 110C. Alternately, the server 120 might also mix video streams to form a composite video stream (e.g., one video stream that contains both Alka and Lakshman in FIG. 2) for transmission to the receiver client 110C. In these examples, the client 110C may still be responsible for synchronizing received audio and video since transmission of packets over network 150 typically will not preserve their timing. In another variant, the server 120 might also synchronize the audio stream and video stream, for example by combining the two data streams into a single data stream that contains both audio and video in the correct time relationship.

However, any architecture which shifts computational burden from the clients 110 to the server 120 will require more powerful servers and may limit the scalability of the solution. For example, the mixing of video streams at the server typically requires the server to decompress both video streams, combine them (often into a non-standard format) and then recompress the mixed video stream. If a video conference has four participants and each participant is viewing the three other participants, this requires the server to decompress the four video streams, combine them three at a time into four composite video streams, and then recompress the four composite video streams. If there are multiple video conferences active at the same time, the burden on the server scales accordingly and the server preferably would be sized to handle the worst case computational burden. On the other hand, if the functionality is implemented in the clients, then the computational resources available (i.e., the number of clients) naturally grows with the number of participants and number of video conferences.

In a peer-to-peer architecture, each sender 110A-B might send its audio and video streams directly to each receiver 110C, which then is responsible for locally synchronizing and/or mixing the various data streams.

Figure 3:
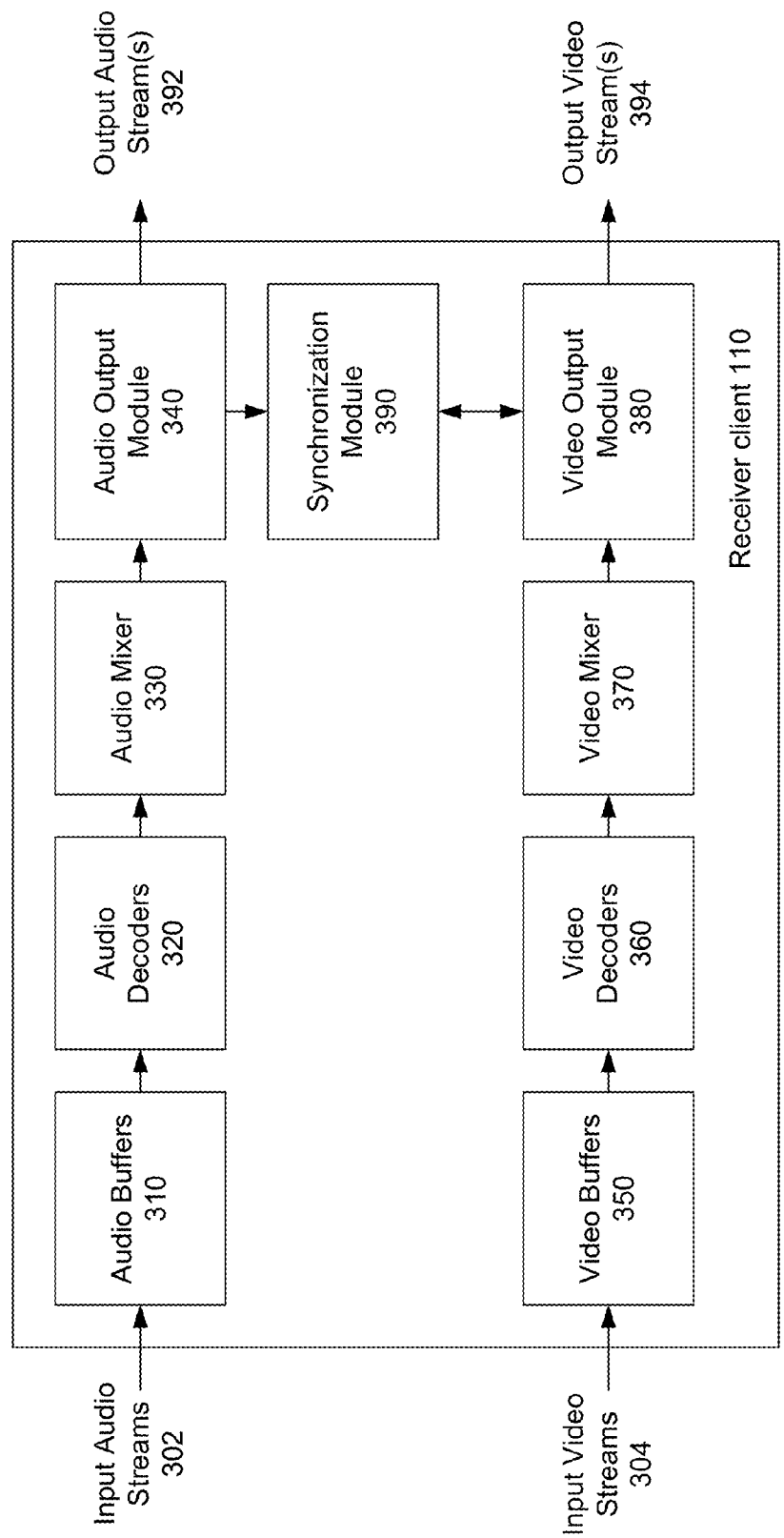
FIG. 3 is a block diagram of an example client according to the invention.

FIG. 3 is a block diagram of one example of a client for synchronizing and mixing audio and video streams according to the invention. The client includes audio buffers 310, audio stream decoders 320, audio mixer 330 and audio output module 340. The client also includes video buffers 350, video stream decoders 360, optional video mixer 370 and video output module 380. The client receives audio streams 302 and video streams 304 from the various sender clients 110A-B (via the server 120) and produces an output audio stream 392 (typically, only one) and output video stream(s) 394 (possibly, more than one) for display on the receiver client 110C. The output data streams are synchronized by synchronization module 390. The input data streams usually will not be received in a synchronized manner.

Using FIG. 2 as an example, the audio stream 392 displayed by Gowreesh's client typically will mix the audio from Alka and Lakshman. The video stream 394 typically would include two video streams, one of Lakshman and one of Alka. The audio and video streams 392, 394 are synchronized.

Consider first the mixing of different audio streams 302. Assume that audio data is captured and played back in certain duration "audio chunks." Currently, the capture is done in audio chunks of 40 ms each. The number of samples in each audio chunk is determined by the sampling frequency (and possibly also the number of audio channels). These audio chunks are packetized and sent by the sender clients 110A-B to the receiver client 110C. For simplicity, assume that an entire audio chunk fits into a single data packet. If multiple packets are required, the packets can be reassembled into the original audio chunks.

When packets of audio are received over a network, there can be loss and also delays. Thus, during mixing, for example, one sender's audio chunk may be available but another sender's chunk may not be available as yet (but yet should be included in the mix to prevent distortion). In one approach, the idea is to cycle through the senders putting one audio chunk from each sender into the mix. If the process reaches a sender but the sender's audio chunk is not available, then cycle through the remaining senders and, at the end of the cycle, come back and recheck whether the sender's audio chunk is now available. The sender may be rechecked a certain number of times before the process times out. In one approach, the existing audio chunks may be mixed by audio mixer 330 without the missing audio chunks, which may be assumed as dropped.

Figure 4:
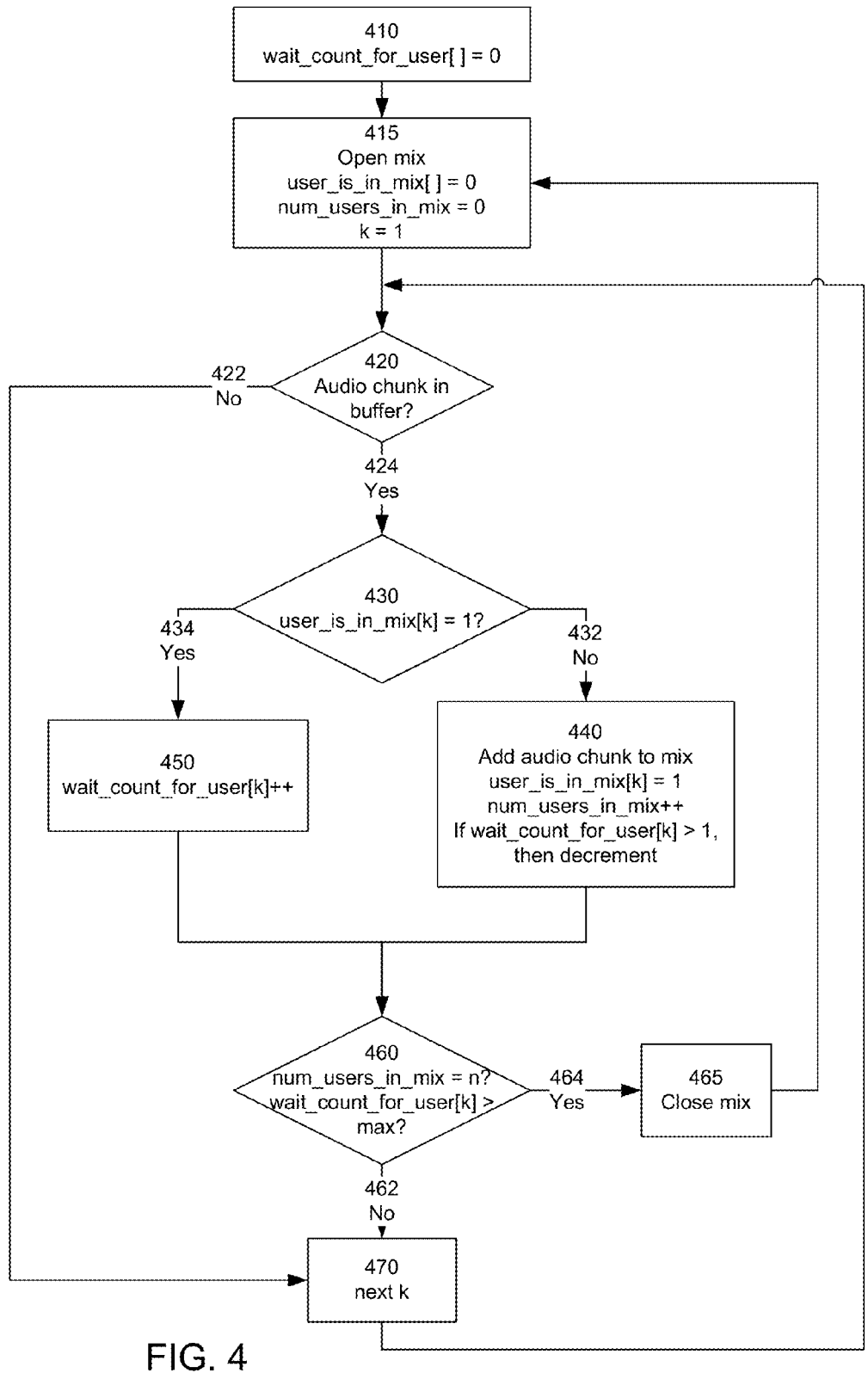
FIGS. 4-5 are flow diagrams of different methods for mixing audio streams.
Figure 5:
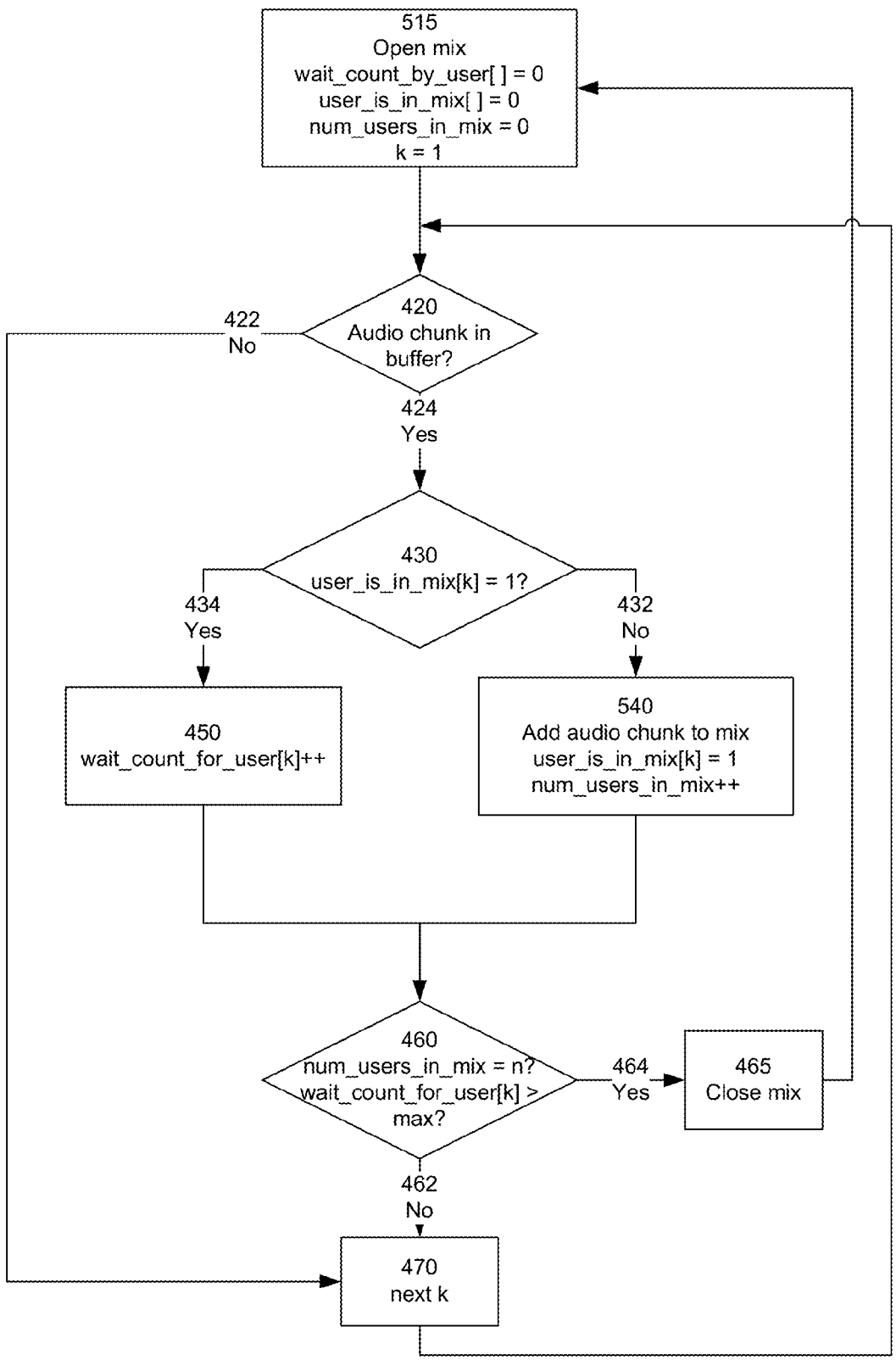

FIGS. 4-6 are flow diagrams showing three different implementations for mixing audio chunks. In these flow diagrams, audio chunk size is expressed in milliseconds (ms). This will be the duration of audio that will be played before the next audio chunk is played. A "mix" is the set of all audio chunks that should be combined at a given instant. The mix may have the audio chunks combined using standard approaches or may be kept separate for playback in a player which will mix it. If there are n+1 participants in a video conference, then there typically will be n senders for each receiver. That is, the mix for the receiver at a time t should include the audio chunks for time t from the n senders. A particular sender is "in the mix" if his audio chunk is available for mixing. The mix is "complete" when all audio chunks are available for mixing.

The following symbols are used in FIGS. 4-6. Senders are sometimes referred to as users:

n is the number of audio streams that are to be mixed (i.e., number of senders). Typically, a value of n implies a video conference with n+1 participants. A complete mix will have n audio chunks, one from each sender.

user_is_in_mix is an array of dimension n. Each element k of the array is either 0 or 1. If user_is_in_mix[k]=1, this means the audio chunk for sender k is in the mix. A value of 0 means it is not in the mix.

num_users_in_mix is the total number of senders currently in the mix. This is the summation of the elements of the array user_is_in_mix. If num_users_in_mix=n, then that mix is complete. If <n, then it is incomplete.

wait_count_for_user is an array of dimension n. wait_count_for_user[k] is the number of times that sender k, who is already in the mix, has an audio chunk available for some future mix, but must wait because the current mix is not yet complete.

max_wait_count is the maximum value of wait_count_for_user for any sender k before the mix is closed (even though still incomplete). Analysis, confirmed by experimentation, suggests that the value 3 works well, although other values can also be used.

q_count_for_user is an array of dimension n. queue_count_for_user[k] is the number of audio chunks that sender k, who is already in the mix, has available for future mixes. The audio chunks are queued because the current mix is not yet complete.

max_q_count is the maximum value of queue_count_for_user for any sender k before the mix is closed (even though still incomplete).

k is a counter that counts through the senders.

Three example algorithms are described in FIGS. 4-6. In the first two, audio buffers are filled for each sender as packets arrive, and the mixing process independently accesses these buffers. In the third example, as each packet arrives, it is sent to the mixing algorithm and processed immediately if possible or else stored in a buffer for future processing. The decoding of the packets is not directly relevant to the discussion and can take place at one of several different points. An important concept in all the algorithms is the wait count or queue count, which allows the handling of delays in when the packets are received.

The general idea behind FIG. 4 is as follows, with reference to FIG. 3. Audio chunks arrive over a network and are put into the appropriate audio buffer 310, with different buffers 310 for each sender. This typically is an independent process and implemented as a separate thread. The mixing algorithm 330 is started 410, 415 independently and accesses the audio buffers 310 in sequence (loop 470). For each audio buffer (sender), if there is no audio chunk available 422, then the process proceeds 470 to the next audio buffer. If there is an audio chunk available 424, then the process checks 430 whether that sender is already in the mix. If not 432, then the audio chunk is added 440 into the mix (assuming the audio chunk is for the right time period). If a sender is already in the mix 434, then his/her wait count is increased 450 by 1. The process then checks 460 whether the mix should be closed. The mix is closed 464, 465, if the mix is now complete (i.e., all senders are in the mix) or if the process meets some other predetermined early close condition, for example if the process times out or, in this case, if the maximum wait count for any sender is reached. If the mix is not closed, the loop 470 increments to the next audio buffer. When the next mix is opened 415, then as each sender's audio chunk is added 440 to the mix, the wait count, if positive, is decremented (last step in 440).

FIG. 5 is a variation of FIG. 4. The difference is that each time a new mix is opened 515, the wait count for all users is initialized to zero. Also compare step 540 to step 440.

Figure 6A:
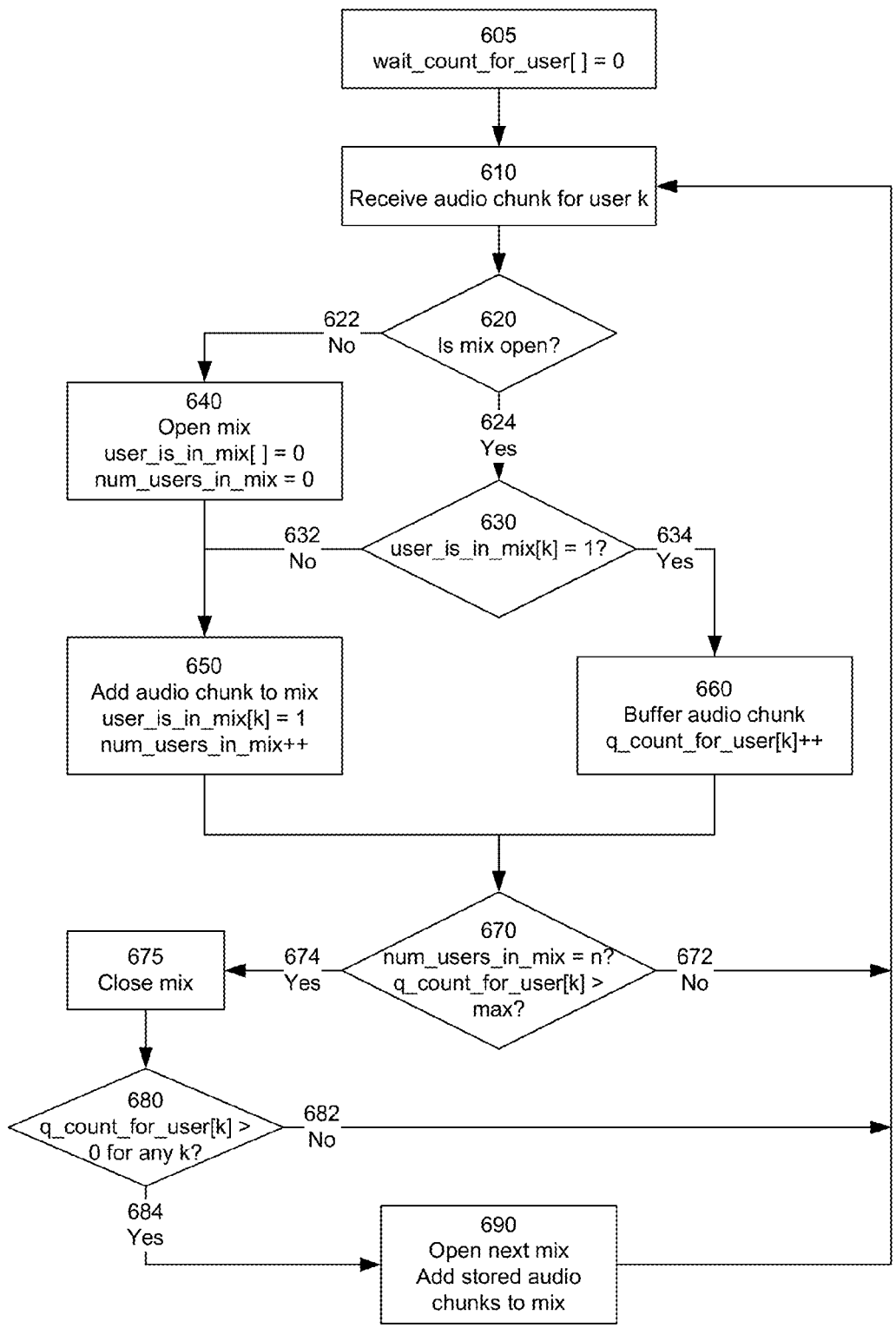
FIGS. 6A-6B are a flow diagrams of another method for mixing audio streams.
Figure 6B:
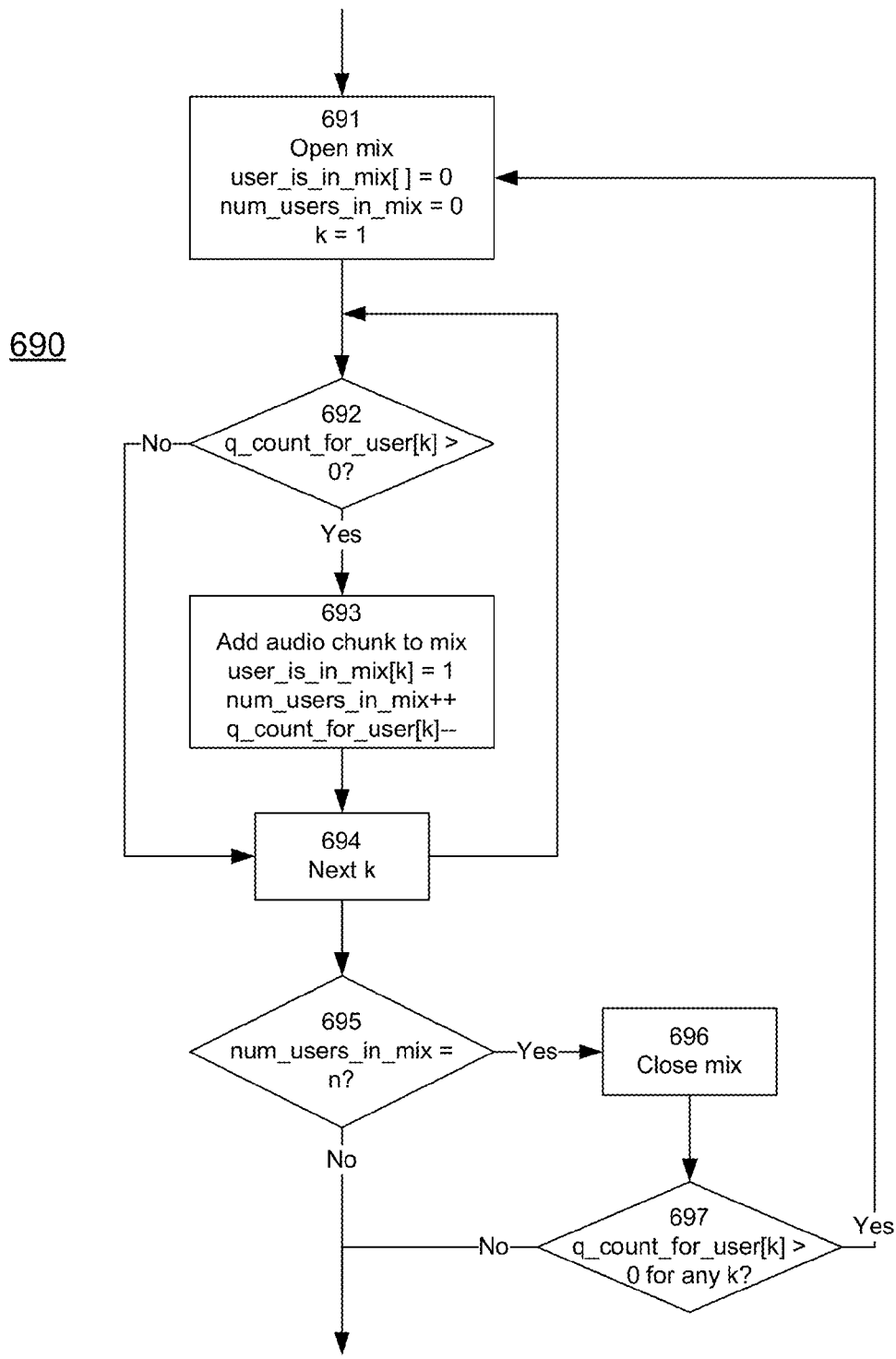

FIGS. 4 and 5 typically are implemented as two threads because the audio chunks are received independently of when they are processed by the mixing algorithm. FIG. 6A-6B is an example that coordinates the receiving of audio chunks with the mixing. It can be implemented as a single thread. In FIGS. 4 and 5, the process was driven by automatically buffering the audio chunks as they are received and then sequentially cycling through the audio buffers. In FIG. 6, the process is driven by the receipt of audio chunks.

Referring to FIG. 6A, the general idea is as follows. Audio chunks arrive over a network as mentioned before. This time, however, as each chunk is received 610, it is evaluated for possible mixing. If a mix is not 622 currently open, then a new mix is opened 640 and the received audio chunk is added 650 to the mix (if for the correct time period). If a mix is already open 624, then there are two possibilities. If this sender is not 632 in the mix, then the audio chunk is added 650 to the mix. If this sender is 634 in the mix, then the audio chunk is buffered 660 for use in a future mix and the queue count for the user is increased 660 by 1. In step 670, once each sender has an audio chunk in the mix or the queue count reaches its maximum (or other early close condition is met), the mix is closed 674, 675. Otherwise 672, the process waits to receive 610 the next audio chunk.

When a mix is closed 676, there may be several audio chunks in the buffers (from step 660). If this is ignored, the buffers may overflow. Accordingly, in this example, when the mix is closed 675, a check 680 is performed to see if the queue count of any sender is greater than zero. If not 682, then the process waits 610 to receive the next audio chunk.

However, if any queue count is greater than zero 684, then the process tries to use 690 these stored audio chunks. For example, a new mix could be opened in step 690 and any applicable stored audio chunks added to the mix (which could be from more than one sender), decrementing the corresponding queue counts. Various approaches can be used to do this. If the mix can be completed, then the process 680-690 repeats. Once the process 690 of trying to deplete the audio buffers is completed, the process returns to be driven by receiving 610 the next audio chunk. The process of trying to use stored audio chunks can also be used in the processes of FIGS. 4-5.

FIG. 6B is a flow diagram of one approach to process 690. In this example, a new mix is opened 691. The process cycles 694 through the buffers for the senders. If a sender has an audio chunk available 692, it is added to the mix 693 and the queue counter for that sender is decremented. If audio chunks are available for all senders, then the mix will be completed 695. In that case, the mix is closed 696. If any queue count is greater than zero 697, then the process repeats. If the mix is not complete, then the process returns to receive 610 the next audio chunk.

In FIG. 6, the queue count has a slightly different meaning than the wait count in FIGS. 4-5. In FIG. 6, the queue count for a sender is the number of audio chunks currently buffered waiting for a next mix. In FIGS. 4-5, the wait count was the number of times a particular sender had to wait because he was already in the current mix and had additional audio chunks buffered for future mixes.

The above algorithms do not address where the mixed audio is stored. Typically the mix is stored in a buffer which is accessed by the playback process. Thus, it may happen that when a new mix is opened, the buffer may be full. In this case, one strategy is to check every few ms (for example $S_A/8$) if a slot is open in the buffer (due to playback).

Now turn to video synchronization. With respect to FIG. 2, Alka's video should be synchronized to Alka's audio. If Alka's and Lakshman's audio streams have been mixed to produce a composite audio stream, then Alka's video should be synchronized to the composite audio stream. Audio-video synchronization is preferably achieved by playing the audio stream and synchronizing the video stream to the audio playback. This is due in part because the audio stream has a tighter time tolerance (i.e., jitter tolerance) for playback.

A time marker is added to each audio chunk or video frame captured. In the case of audio if a 40 ms audio chunk is captured, then the marker is tracked as of the start of the audio sample. A 40 ms audio chunk, however, will have many audio samples. The exact number is determined by the sampling frequency. Mixed audio streams also have time markers, preferably one for each sender's audio chunk in the mix. The original audio streams have time markers and, when they are mixed to form a composite audio stream, the time marker preferably is retained for the composite audio stream. Note that the time marker need not be an actual time stamp but can be any sort of relative counter.

The differences between the audio chunk versus video frames can be explained in terms of how they are treated. For video, suppose 25 video frames per second (fps) are captured. Then each video frame is displayed and held for 40 ms (1000/25). At 30 frames per second, each video frame is held for 33⅓ ms on display. For audio, suppose audio is captured in 40 ms chunks. Then 40 ms worth of audio are played back at a time, but that 40 ms audio chunk includes many audio samples per the sampling rate. The audio playback is effectively continuous relative to the video playback because there are many audio samples per video frame. Thus, the synchronization problem is to match the video playback to the audio playback. This can be done by suitably marking the two data streams and then matching the marks within specified tolerances.

In some sense, the audio playback is used to clock the video playback. In one approach, synchronization occurs as follows.

If the time marker of the video frame matches the time of the audio playback, then display the video frame.

If the time marker of the video frame is ahead of that for the audio playback, then wait.

If the time marker of the video frame is behind that for the audio playback, then skip the video frame.

The decision as to whether the video is behind, at, or ahead of the audio is determined within a certain tolerance.

Figure 7:
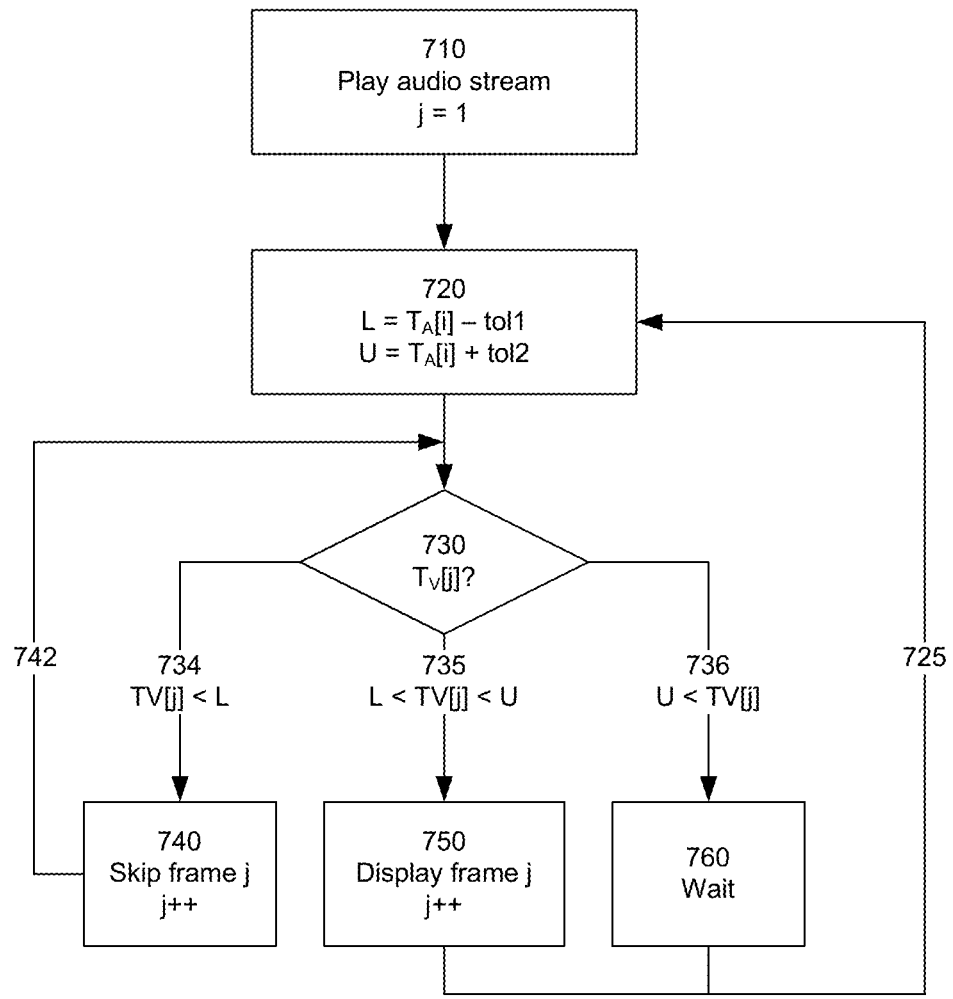
FIG. 7 is a flow diagram of a method for synchronizing audio and video streams.

FIG. 7 is a flow diagram of a specific implementation, using the following symbols:

$S_A$ is the size of the audio chunk in milliseconds. Audio is captured $S_A$ ms at a time.

$T_A[i]$ is the time at which the ith audio chunk was captured, in milliseconds.

$T_V[k]$ is the time at which the kth video frame was captured, in milliseconds.

f is the frame rate, in frames per second.

$f_D$ is the frame display duration, in milliseconds. $f_D=(1/f)*1000$.

tol1 is a tolerance for the lower bound, in milliseconds. This can be zero or higher. In practice, tol1=2 appears to work well for $S_A$=40 ms.

tol2 is the tolerance for the upper bound. This can be zero or higher. In practice, tol2=0 appears to work well.

In FIG. 7, the basic idea is that if $T_V[k]$ falls within the time period calculated for the current audio chunk, then video frame k should be displayed. The nominal time period runs from $T_A[i]$ to $T_A[i]+S_A$. which starts at time $T_A[i]$ and ends at time $T_A[i]+S_A$. Tolerances tol1 and tol2 are used to add robustness, so that the calculated time period has a start time of $T_A[i]$−tol1 and an end time of $T_A[i]+S_A$+tol2. This assumes that the times $T_V[k]$ and $T_A[i]$ are measured relative to the same reference time. This can be achieved, for example, by starting the audio and video capture threads at the same time relative to a common clock. Alternately, the sender client can start the clocks for audio and video capture at the same time. Equivalently, if the audio and video capture clocks use different time references, the offset between the two can be compensated.

In more detail, the process initializes 710 by initializing the video frame counter j and starting playback of the audio stream. In step 720, lower bound L and upper bound U are calculated for the current audio chunk being played. It is then determined 730 whether video frame j falls within the time period spanned by the current audio chunk. If it does 735, then the video frame is displayed 750 and the counter j is incremented to move to the next video frame and the process is repeated 725. If the video frame j occurs after 736 the current audio chunk (i.e., in the future), then nothing happens. The process waits 760 and repeats 725 the process at a later time. If the video frame j was to have occurred before 734 the current audio chunk, then the video frame is discarded 740 and the next video frame is tested 742 to see if it occurs during the current audio chunk. This process can be repeated until the video stream catches up to the audio stream.

The present invention has been described in particular detail with respect to a limited number of embodiments. One skilled in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CDs, DVDs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A computer-implemented method for producing a video conference display for a receiver participant, the method comprising:
    receiving over a network two or more audio streams and two or more video streams from two or more sender participants, the audio streams divided into audio chunks and the video stream(s) divided into video frames, each audio chunk including an audio time marker from its sender participant indicating a start of the audio chunk and each video frame including a video time marker from its sender participant indicating a start of the video frame, the time markers from different sender participants independent of one another;
    generating and playing a composite audio stream of the received audio streams, said generating and playing comprising repeating the steps of:
    opening a mix;
    adding-audio chunks from the two or more sender participants to the mix, each chunk retaining an audio time marker from its sender participant;
    closing the mix if either audio chunks from all sender participants are in the mix or if a predetermined early close condition is met; and
    playing the combined audio chunks in the mix in an order of receipt of the audio chunks; and
    repeatedly determining, independently for each sender participant, if a current video frame of the video stream should occur during the playing of an audio chunk from the sender participant in a current mix, the determining comprising:
        identifying the audio time marker of the audio chunk in the mix from the sender participant;
        calculating a time tolerance for the audio time marker;
        comparing a video time marker for the current video frame to the time tolerance of the audio time marker;
        if the video time marker for the current video frame is within the time tolerance for the audio time marker, then displaying the current video frame and moving to a next video frame;
        if the current video frame should occur after the time marker for the audio time marker, then waiting; and
        if the current video frame should have occurred before the time marker for the audio time marker, then discarding the current video frame and moving to a next video frame.

2. The computer-implemented method of claim 1 wherein the step of generating and playing a composite audio stream further comprises:
    buffering the received audio chunks; wherein the step of adding audio chunks to the mix comprises cycling through the sender participants, and for each sender participant on each cycle, if the sender participant is not yet in the mix, adding the sender participant's audio chunk to the mix if the missing audio chunk is available from the buffer, the audio chunk retaining its audio time marker.

3. The computer-implemented method of claim 1 wherein the step of generating and playing a composite audio stream further comprises:
    as each sender participant's audio chunk is received, if the sender participant is not yet in the mix and the received audio chunk is the correct audio chunk for the mix, adding the sender participant's audio chunk to the mix, the audio chunk retaining its audio time marker; and, otherwise, buffering the sender participant's audio chunk for a future mix.

4. The computer-implemented method of claim 1, wherein each the time marker includes the time tolerance, the time tolerance comprising a nominal start time and a nominal end time for the audio chunk, the nominal start time adjusted by a first tolerance to be lower, and the nominal end time adjusted by a second tolerance to be higher.

5. A computer program product stored on a non-transitory computer-readable medium that includes instructions that, when loaded into memory, cause a processor to perform a method, the method comprising:
    receiving over a network two or more audio streams and two or more video streams from two or more sender participants, the audio streams divided into audio chunks and the video stream(s) divided into video frames, each audio chunk including an audio time marker from its sender participant indicating a start of the audio chunk and each video frame including a video time marker from its sender participant indicating a start of the video frame, the time markers from different sender participants independent of one another;
    generating and playing a composite audio stream of the received audio streams, said generating and playing comprising repeating the steps of:
    opening a mix;
    adding-audio chunks from the two or more sender participants to the mix, each chunk retaining an audio time marker from its sender participant;
    closing the mix if either audio chunks from all sender participants are in the mix or if a predetermined early close condition is met; and
    playing the combined audio chunks in the mix in an order of receipt of the audio chunks; and
    repeatedly determining, independently for each sender participant, if a current video frame of the video stream should occur during the playing of an audio chunk from the sender participant in a current mix, the determining comprising:
        identifying the audio time marker of the audio chunk in the mix from the sender participant;
        calculating a time tolerance for the audio time marker;
        comparing a video time marker for the current video frame to the time tolerance of the audio time marker;
        if the video time marker for the current video frame is within the time tolerance for the audio time marker, then displaying the current video frame and moving to a next video frame;
        if the current video frame should occur after the time marker for the audio time marker, then waiting; and
        if the current video frame should have occurred before the time marker for the audio time marker, then discarding the current video frame and moving to a next video frame.

6. The computer program product of claim 5 wherein the step of generating and playing a composite audio stream further comprises:

buffering the received audio chunks; wherein the step of adding audio chunks to the mix comprises cycling through the sender participants, and for each sender participant on each cycle, if the sender participant is not yet in the mix, adding the sender participant's audio chunk to the mix if the missing audio chunk is available from the buffer, the audio chunk retaining its audio time marker.

7. The computer program product of claim 5 wherein the step of generating and playing a composite audio stream further comprises:

as each sender participant's audio chunk is received, if the sender participant is not yet in the mix and the received audio chunk is the correct audio chunk for the mix, adding the sender participant's audio chunk to the mix, the audio chunk retaining its audio time marker; and, otherwise, buffering the sender participant's audio chunk for a future mix.

8. The computer program product of claim 5, wherein each the time marker includes the time tolerance, the time tolerance comprising a nominal start time and a nominal end time for the audio chunk, the nominal start time adjusted by a first tolerance to be lower, and the nominal end time adjusted by a second tolerance to be higher.

\* \* \* \* \*